(12) United States Patent
Koppula et al.

(10) Patent No.: US 12,368,579 B2
(45) Date of Patent: Jul. 22, 2025

(54) ADAPTIVE MULTIPARTY NON-INTERACTIVE KEY EXCHANGE

(71) Applicant: NTT Research, Inc., Sunnyvale, CA (US)

(72) Inventors: Venkata Koppula, Delhi (IN); Brent Waters, Austin, TX (US); Mark Zhandry, Princeton, NJ (US)

(73) Assignee: NTT Research, Inc., Sunnyvale, CA (US)

( * ) Notice: Subject to any disclaimer, the term of this patent is extended or adjusted under 35 U.S.C. 154(b) by 243 days.

(21) Appl. No.: 18/193,628

(22) Filed: Mar. 30, 2023

(65) Prior Publication Data

US 2023/0318813 A1    Oct. 5, 2023

Related U.S. Application Data

(60) Provisional application No. 63/325,581, filed on Mar. 30, 2022.

(51) Int. Cl.
*H04L 9/40*    (2022.01)
*H04L 9/08*    (2006.01)

(52) U.S. Cl.
CPC ............ *H04L 9/083* (2013.01); *H04L 9/0825* (2013.01); *H04L 9/0861* (2013.01)

(58) Field of Classification Search
CPC ..... H04L 9/083; H04L 9/0825; H04L 9/0861; H04L 9/085; H04L 9/3271; H04L 9/3255
See application file for complete search history.

(56) References Cited

U.S. PATENT DOCUMENTS

| 2020/0274704 A1* | 8/2020 | Matsui | H04L 9/0833 |
| 2023/0198758 A1* | 6/2023 | Castelluccia | H04W 12/0471 |
| | | | 713/171 |

OTHER PUBLICATIONS

Lee et al., "Forward Secure Non-Interactive Key Exchange from Indistinguishability Obfuscation", Aug. 2015, 4 pages (Year: 2015).*

* cited by examiner

*Primary Examiner* — Thaddeus J Plecha
(74) *Attorney, Agent, or Firm* — CipherLaw

(57) ABSTRACT

Disclosed is an adaptively secure multiparty non-interactive key exchange (NIKE) from polynomially hard indistinguishability obfuscation and other standard assumptions. This improves on all prior such protocols, which required sub-exponential hardness. Several compilers are established which simplify the task of constructing new multiparty NIKE protocols, and also establish a close connection with a particular type of constrained PRF.

20 Claims, 3 Drawing Sheets

ADAPTIVE MULTIPARTY NON-INTERACTIVE KEY EXCHANGE

CROSS-REFERENCE TO RELATED APPLICATIONS

This application claims the benefit of U.S. Provisional Application No. 63/325,581, filed Mar. 30, 2022, the entire contents of which are incorporated herein by reference.

FIELD OF THE INVENTION

The disclosure relates to multiparty non-interactive key exchange attaining adaptive security under polynomially-hard non-interactive assumptions. Assumptions are indistinguishability obfuscation (iO) and standard assumptions on cryptographic groups

BACKGROUND OF THE INVENTION

Non-interactive key exchange (NIKE) is a fundamental application in public key cryptography. In a G-party NIKE protocol, a group of G users simultaneously publish individual public keys to a bulletin board, keeping individual secret keys to themselves. Then just by reading the bulletin board and using their individual private keys but no further interaction, the G users can arrive at a common key hidden to anyone outside the group.

In this work, we build multiparty NIKE attaining adaptive security under polynomially-hard non-interactive assumptions. Our assumptions are indistinguishability obfuscation (iO) and standard assumptions on cryptographic groups. We note that there are two uses of the term "group": the group of users establishing a shared key, and the cryptographic group used as a tool in our constructions. Which use of the term should always be clear from context. The main restriction is that we must bound the number of users that can be adaptively corrupted. That is, the number of honest users, and even the number of adversarially generated users, can be unbounded; only the number of users that were initially honest and later corrupted must be bounded. This improves on prior standard-model adaptively secure schemes, which all bound the total number of users, and also required either interactive or sub-exponential assumptions. Along the way, we give a toolkit for designing iO-based multiparty NIKE, with several compilers to simplify the design process. We also explore adaptive security for constrained PRFs, giving a new construction for what we call "one symbol fixing" constraints, and show a close connection to multiparty NIKE.

0.1 Prior Work and Motivation

NIKE has a long history, with the 2-party case dating back to the foundational work of Diffie and Hellman, and the multiparty case already referred to as "a long-standing open problem" in 2002. Joux gave a 3-party protocol from pairings. The first protocol for G≥4 used multilinear maps, though the only protocols directly based on multilinear maps that have not been attacked are limited to a constant number of users. Currently, the only known solutions for a super-constant number of users are built from indistinguishability obfuscation (iO). The first such construction for polynomially-many users was due to Boneh and Zhandry (using punctured programming techniques), with a number of follow-up works.

Multiparty NIKE remains a fascinating object: the central feature of non-interactive key exchange (as opposed to protocols requiring multiple interaction rounds) is that public keys can be re-used across many groups, simplifying key management and significantly reducing communication. This feature makes NIKE an important tool with many applications. Multiparty NIKE in particular is a useful tool for group key management and broadcast encryption with small parameters. Multiparty NIKE is also interesting from a foundational perspective, being perhaps the simplest cryptographic object which currently is only known via obfuscation. Multiparty NIKE can also be built via functional encryption, which is equivalent to iO under sub-exponential reductions.

Adaptive Security. The re-use of public keys in a NIKE protocol, on the other hand, opens the door to various active attacks. For example, if a shared key for one group is accidentally leaked, it should not compromise the shared key of other groups, including those that may intersect. Worse, an adversary may participate in certain groups using maliciously generated public keys, or may be able to corrupt certain users. Finally, decisions about which groups' shared keys to compromise, how the adversary devises its own malicious public keys, which users to corrupt, and even which set of users to ultimately attack, can all potentially be made adaptively.

Adaptive security is an important goal in cryptography generally, being the focus of hundreds if not thousands of papers. Numerous works have considered adaptive NIKE. In the 2-party case, adaptive security can often be obtained generically by guessing the group that the adversary will attack. If there are a total of N users in the system, the reduction loss is $N^2$, a polynomial. The focus of works in the 2-party case has therefore been tight reductions, which still remains unresolved.

The situation becomes more critical in the multiparty case, where the generic guessing reduction looses a factor of $$\binom{N}{G} \approx N^G,$$

which is exponential for polynomial group size G. In order to make this generic reduction work, one must assume the (sub)exponential hardness of the underlying building blocks and scale up the security parameter appropriately. This therefore results in qualitatively stronger underlying computational assumptions. A couple works have attempted to improve on this reduction, achieving security in the random oracle model, or under interactive assumptions. Note that multiparty NIKE security itself can already be phrased as an interactive assumption. In fact, Rao argues that an exponential loss or interactive assumption is likely necessary, by giving a black box impossibility of a polynomial reduction to non-interactive assumptions. This impossibility will be discussed in more depth momentarily. We also note that existing standard-model schemes with adaptive security all limit the total number of users, including both honest and dishonest users, to an a priori polynomial bound.

Constrained PRFs. A constrained PRF is a pseudorandom function which allows the key holder to produce constrained keys $k_C$ corresponding to functions C. The key $k_C$ should allow for evaluating the PRF on any input x where C(x)=1, but the output should remain pseudorandom if C(x)=0. First proposed in three concurrent works, constrained PRFs have become a fundamental concept in cryptography, with many follow-up works. A particularly interesting class of constrained PRFs are those for bit-fixing constraints, where C takes the form of a vector $v \in \{0, 1, ?\}^n$, and accepts any string x such that $v_i=x$, or $v_i=?$ for all i. Bit-fixing constrained PRFs give secret key broadcast encryption, for example.

Adaptive security is of particular interest for constrained PRFs. For example, Boneh and Zhandry build "semi-statically" secure NIKE from adaptively secure constrained PRFs. Unfortunately, with one exception, all known adaptively secure constrained PRFs require random oracles, super-polynomial hardness, or a constant collusion resistance bound. There is one exception for simple puncturing constraints, where C contains a list of polynomially-many points, and accepts all inputs not in the list. Even with such simple constraints, the construction requires iO, algebraic tools, and a non-trivial proof. Fuchsbauer et al. show that the bit-fixing construction of Boneh and Waters inherently loses a superpolynomial factor in any reduction to non-interactive assumptions.

0.2 Technical Challenges

Rao's impossibility. Rao proves that multiparty NIKE protocols with standard model proofs relative to non-interactive assumptions (including iO) must incur an exponential loss. The proof follows a meta-reduction, which runs the reduction until the reduction receives the challenge from the underlying non-interactive assumption. At this point, Rao argues that the adversary need not commit to the group it will attack. Now, we split the reduction into two branches:

In the first branch, choose and corrupt an arbitrary honest user i, obtaining secret key $sk_i$. Then abort the branch.

In the second branch, choose the group S to attack such that (1) S contains only honest users for this branch, and (2) $i \in S$. User i is honest in this branch since it was never corrupted here, despite being corrupted in the other branch. Use $sk_i$ to compute the shared group key.

From the view of the reduction, the second branch appears to be a valid adversary. Hence, by the guarantees of the reduction, it must break the underlying hard problem, a contradiction. Hence, no such reduction could exist.

Rao's proof is quite general, and handles reductions that may rewind the adversary or run it many times concurrently. It also works in the more restricted setting where there is an upper bound on the total number of users in the system.

There is one way in which Rao's result does not completely rule out a construction relative to polynomial hardness: in order to guarantee that the second branch is successful, one needs that the shared key derived from $sk_i$ must match the shared key in the second branch. This would seem to follow from correctness, as i is a member of the group S. However, correctness only holds with respect to honestly generated public and secret keys. The reduction may, however, give out malformed public or secret keys that are indistinguishable from the honest keys. In this case, it may be that $sk_i$ actually computes the wrong shared key, causing the meta-reduction to fail.

Rao therefore only considers reductions where, roughly, the public keys of the users outputted by the reduction, even if not computed honestly, uniquely determine the shared key. Rao calls these "admissible reductions." Analogous lower bounds have been shown for tight reductions in the 2-party setting, making similar restrictions on the reduction referred to as "committing reductions."

All existing reductions for multiparty NIKE from iO are admissible. A closer look reveals that all such schemes derive the shared key from some constrained PRF applied to the public values of the users. While the secret key is used to compute this value, the value itself does not depend on the secret key, only the public key. Therefore, Rao's impossibility captures all the existing techniques, and new ideas are required to achieve adaptive security from static polynomial assumptions.

Dual system methodology The situation is reminiscent of HIBE and ABE, where Lewko and Waters showed that adaptive security cannot be proved under polynomially hard non-interactive assumptions, using reductions that always output secret keys which decrypt consistently. Solutions overcoming this barrier were already known, say based on dual system encryption. The point of prior work was to explain necessary features of those proofs.

The multiparty NIKE setting appears much more challenging. HIBE and ABE benefit from a central authority which issues keys. In the proof, the reduction provides the adversary with all of the keys, which will have a special structure that allows for decrypting some ciphertexts and not others. In the NIKE setting, the adversary is allowed to introduce his own users. This presents many challenges as we cannot enforce any dual system structure on such users. It also gives the adversary a lot more power to distinguish the reduction's keys from honestly generated keys, as the adversary can request the shared keys of groups containing both honest and malicious users.

Very recently, Hesse et al. show how to circumvent the above barriers in the 2-party setting. However there is no obvious analog to the multiparty setting.

Another barrier: adaptive constrained PRFs. Looking ahead, we will show that adaptive multiparty NIKE implies adaptive constrained PRFs for a limited "one symbol fixing" functionality. Here, the inputs are words over a polynomial-sized alphabet E, and constrains have the form (?, ?, ..., ?, s, ?, ...), constraining only a single position to some character. The resulting PRFs are fully collusion resistant. One-symbol-fixing constrained PRFs can be seen as a special case of bit-fixing PRFs, where only a single contiguous block of bits can be fixed. Adaptive constrained PRFs for even very simple functionalities have remained a very challenging open question. In particular, no prior standard-model construction from polynomial hardness achieves functionalities that have a superpolynomial number of both accepting and rejecting inputs. Any adaptive multiparty NIKE construction would along the way imply such a functionality, representing another barrier.

BRIEF SUMMARY OF THE INVENTION 0.3 Result Summary

We give several compilers, allowing us to simplify the process of designing multiparty NIKE schemes. One compiler shows how to generically remove a common setup from multiparty NIKE (assuming iO). We note that many iO-based solutions could be tweaked to remove setup, but the solutions were ad hoc and in the adaptive setting often required significant effort; we accomplish this generically.

Another compiler shows that it suffices to ignore the case where the adversary can compromise the security of shared keys for a different groups of users. That is, we show how to generically compile any scheme that is secure against adversaries that cannot compromise shared keys into one that is secure even if the adversary can.

We show a close connection between multiparty NIKE and one-symbol-fixing PRFs:

Adaptively secure multiparty NIKE even for a bounded number of users, and no maliciously generated users implies adaptively secure one-symbol-fixing PRF.

One-symbol-fixing PRFs, together with iO, imply a multiparty NIKE protocol with a bounded number of honest users (and hence also corruption queries) and group size, but an unbounded number of malicious users. This result starts by constructing a weaker NIKE protocol, and then applying our compilers.

We construct adaptively secure one-symbol-fixing PRFs from iO and DDH. We thus obtain multiparty NIKE from the same assumptions with a bounded number of honest users.

We finally give a direct construction of multiparty NIKE from iO and standard assumptions on groups, which allows for an unbounded number of honest users. The construction roughly follows the path above, but opens up the layers of abstraction and makes crucial modifications to attain the stronger security notion. The main limitation is that there is still a bound on the number of users that the adversary can adaptive corrupt, as well as on the group size.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

Figure 1:
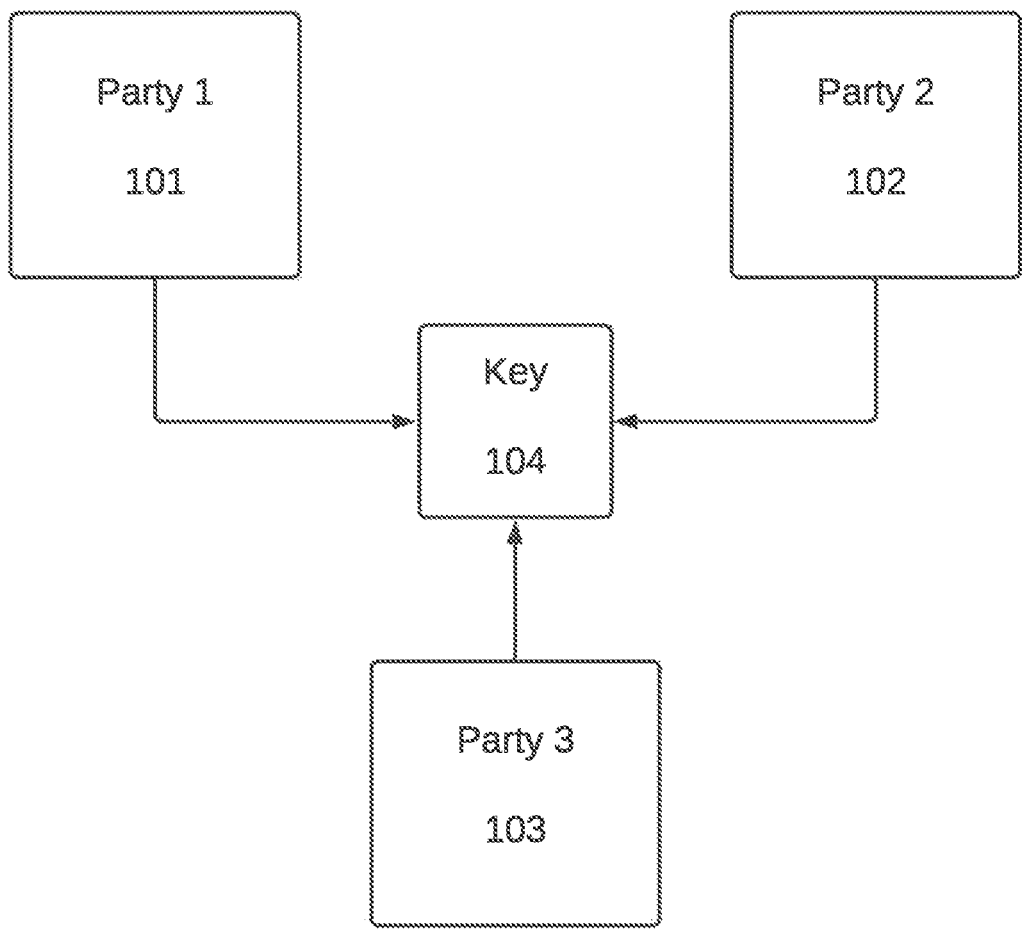
FIG. 1 illustrates an example embodiment of the invention.

1 Introduction
1.1 On Polynomially-Hard iO

Indistinguishability obfuscation can be thought of as an exponential-sized family of assumptions: for every pair of equivalent circuits $C_0$, $C_1$, iO assumes that the obfuscations of $C_0$, $C_1$ are computationally indistinguishable. This puts iO on a different footing that typical assumptions such as DDH, which are just single fixed assumptions.

iO can be constructed from a constant-sized family of assumptions, as shown by Jain, Lin, and Sahai. However, the underlying assumptions must be sub-exponentially hard, and there is evidence that sub-exponential hardness is necessary when reducing from a fixed number of assumptions. Under sub-exponential hardness the resulting iO construction achieves sub-exponential hardness as well. In this case, one can achieve adaptive multi-party NIKE under the same sub-exponential assumptions by starting with a suitable selective scheme (say, Boneh-Zhandry), and then applying the generic reduction between selective and adaptive security.

1.2 Technical Overview

We first briefly recall the types of queries an adversary can make:

Corrupt User. The adversary selects an honest user's public key, and learns the secret key.

Shared Key. The adversary selects a list of public keys, which may contain both honest users adversarially-generated users, and learns the shared key for the group of users. Since the adversary's public keys may be malformed, different users may actually arrive at different shared keys. So the query specifies which of the users' version of the shared key is revealed.

Challenge. Here, the adversary selects a list of honest public keys, and tries to distinguish the shared key from random.

Upgrading NIKE. In addition to providing the first iO-based NIKE, Boneh and Zhandry also construct the first NIKE without a trusted setup, or crs. Their basic idea is to first design an iO-based protocol with a crs, but where the resulting crs is only needed to generate the shared keys, but not the individual public keys. Then they just have every user generate their own crs; when it comes time to compute the shared key for a group, the group arbitrarily selects a "leader" and uses the leader's crs.

The above works in the selective setting. However, in the adaptive setting, problems arise. The crs contains an obfuscated program that is run on the user's secret key. The adversary could therefore submit a Shared Key query on an adversarial public key containing a malicious crs. If that malicious user is selected as the leader for the group, honest users' secret keys will be fed into the malicious program, the output being revealed to the adversary, leading to simple attacks. Worse, in Rao's basic scheme with setup, the users need to know the crs in order to generate their public key. So in the setup-less scheme, each user would need to wait until the leader outputs their crs before they can publish their public key, resulting in an interactive protocol. Boneh and Zhandry and later Rao therefore devised more sophisticated techniques to remove the trusted setup.

Our first result sidesteps the above difficulties, by considering the setting where Shared Key queries are not allowed. In this setting, we can make the above strategy of having each party run their own trusted setup fully generic. To accommodate the case where the public keys may depend on the trusted setup, we actually have each user produce an obfuscation of a program that takes as input the crs, and samples a public key. In order to prove security, we also have the secret key for a user be an obfuscated program, which is analogous to the public key program except that is samples the corresponding secret key. In the reduction, this allows us to adaptively embed information in the secret key, which is needed to get the proof to work. See Section 3.2 for details.

Then we show how to generically lift any NIKE scheme that does not support Shared Key queries into one that does support them, without any additional assumptions. Combined with the previous compiler, we therefore eliminate the crs and add Shared Key queries to any scheme. The high-level idea is to give the reduction a random subset of the secret keys for honest users. The hope is that these keys will be enough to answer all Shared Key queries, while not allowing the reduction to answer the Challenge query. This requires care, as this will not be possible if some of the Shared Key queries have too much overlap with the Challenge query. Our solution is to have each user actually have many public keys, a subset of which will be used to compute shared keys. By carefully choosing subsets using error correcting codes, we can ensure that Shared Key queries are sufficiently far from the Challenge query, allowing the above idea to work. See Section 3.3 for details.

Connection to Constrained PRFs. Multi-party NIKE already had a clear connection to constrained PRFs, with all iO-based NIKE crucially using constrained PRFs. In Section we make this precise, showing that one symbol fixing (1-SF) PRFs are equivalent to NIKE, assuming iO.

One direction is straightforward: to build a 1-SF PRF from multiparty NIKE, create $n \times |\Sigma|$ users, which are arranged in an $|\Sigma|\times n$ grid. Each input in $\Sigma^n$ then selects a single user from each column, and the value of the PRF is the shared key for the resulting set of n users. To constrain the ith symbol to be σ, simply reveal the secret key for user σ in column i.

The other direction is more complicated, and requires additionally assuming iO. The high-level idea is that the shared key for a group of users will be a PRF evaluated on the list of the users' public keys. If we pretend for the moment that user public keys come from a polynomial-sized set Σ, we could imagine using a 1-SF PRF for this purpose.

Following most iO-based NIKE protocols, we will then have a crs be an obfuscated program which takes as input the list of public keys, together with one of the users secret keys, and evaluates the PRF if the secret key is valid. Our novelty is how we structure the proof to attain adaptive security. Observe that user σ's secret key allows them to evaluate the PRF on any input that contains at least one σ. This is the union of the inputs that can be computed by keys that constrain symbol i to σ, as i ranges over all input positions.

We therefore switch to a hybrid where user σ has the aforementioned constrained keys covertly embedded in their secret key. In this hybrid, we crucially allow the reduction to generate the user's public key without knowing the constrained keys, and only later when the adversary makes a corruption query will it query for the constrained keys and construct the user's secret key. This strategy is our first step to overcoming Rao's impossibility result: the shared key is no longer information-theoretically determined by the public keys, and is only determined once the secret key with the embedded constrained key is specified. We note, however, that a version of Rao's impossibility still applies to the underlying adaptively secure constrained PRFs, which we will have to overcome later when constructing our PRF.

Moving to this hybrid is accomplished using a simplified version of delayed backdoor programming. After switching the secret keys for each user, we switch the crs program to use the embedded constrained keys to evaluate the PRF, rather than the master key. At this point, adaptive NIKE security follows directly from adaptive 1-SF PRF security.

Of course, NIKE protocols cannot have public keys in a polynomial-sized set. Our actual protocol first generically compiles a 1-SF PRF into a more sophisticated constrained PRF where now Σ is exponentially large. By adapting the above sketch to this special kind of constrained PRF, we obtain the full proof.

Constructing 1-SF PRFs. We turn to constructing a 1-SF PRF. As mentioned above, a version of Rao's impossibility result still applies even to constrained PRFs. Namely, an "admissible" reduction would commit at the beginning of the experiment to the PRF functionality it provides to the adversary. Such an admissible reduction cannot be used to prove adaptive security for constrained PRFs, for almost identical reasons as with Rao's impossibility. This means our reduction must actually have the PRF seen by the adversary be specified dynamically, where its outputs are actually dependent on prior queries made by the adversary.

One may be tempted to simply obfuscate a puncturable PRF. Boneh and Zhandry show that this gives a constrained PRF for any constraint, though only with selective security. Unfortunately, it appears challenging to get adaptively secure constrained PRFs with this strategy. In particular, the punctured PRF specifies the value of the PRF at all points but one, which is problematic given that we need to dynamically determine the PRF function in order to circumvent Rao's impossibility.

We will instead use algebraic tools to achieve an adaptively secure construction. Our PRF will be Naor-Reingold, but adapted from a binary alphabet to a polynomial-sized alphabet. The secret key contains $n\times|\Sigma|$ random values $e_{j,\sigma}$, and the PRF on input $(x_1, \ldots, x_n)\in\Sigma^n$ outputs $$F(k, x) = h^{\prod_{i=1}^n e_{i,x_i}},$$

where h is a random generator of a cryptographic group. Without using any computational assumptions, F is already readily seen to be a 1-SF constrained PRF for a single constrained key. To constrain position i to σ, simply give out $e_{i,\sigma}$ and $e_{j,x}$ for all $x\in\Sigma$ and all $j\neq i$.

However, we immediately run into trouble even for two constrained keys, since constrained keys for two different i immediately yield the entire secret key. Instead, we constrain keys in this way, except that we embed the constrained keys in an obfuscated program. While this is the natural approach to achieve many-key security, it is a priori unclear how to actually prove security.

We show that obfuscating the constrained keys does in fact upgrade the single-key security of the plain scheme to many-time security. The proof is quite delicate. Essentially, we move to a hybrid where each constrained key uses its own independent h. But here we have a problem: since multiple keys will be able to compute the PRF at the same point, we need to ensure consistency between the keys. Maintaining this consistency is the main challenge in the many-key setting. To maintain such consistency, a constrained key only uses its particular h for inputs that cannot be computed by previous constrained keys. For outputs that can be computed by previous keys, the new constrained key will have to use the h for those keys.

Interestingly, this means that keys in this hybrid must actually contain the h's of all previous constrained keys, and the evaluation of the PRF will actually depend on the order constrained keys are queried. The salient point is that, when the ith constrained key query is made, we only commit to the structure of the PRF on the points that can be evaluated by the first i queries, but the PRF on the remaining part of the domain is unspecified. Structuring the proof in this way is the main insight that allows us to circumvent Rao's impossibility and prove adaptive security.

By careful iO arguments, we show that we are able to move to such a setting where the h for different pieces are random independent bases. The challenge query is guaranteed to be in its own piece, using a different h than all the constrained keys. Therefore, once we move to this setting the constrained keys do not help evaluate the challenge, and security follows. By combining with our compilers, we obtain the following:

Theorem 1 (Informal). Assuming polynomial iO and DDH, there exist an adaptively secure multiparty NIKE where the number of honestly generated users is a priori bounded, but where the number of maliciously generated users is unbounded.

In addition to improving to only polynomial hardness, the above improves on existing works by enhancing the security definition to allow an unbounded number of malicious users. Note that the adversary can always create some of its unbounded malicious users in an honest way. In some ways, such users behave as challenger-generated honest users, in that they can be corrupted trivially since the adversary already knows their secret key. But on the other hand, they can never be a part of the challenge set of users. Therefore, another way of phrasing security is that the adversary must commit to a bounded-sized set of initially-honest users T, such that the challenge set is a subset of T. Other than the bound on T, the number of honest and malicious users is unbounded. Such a security notion may be useful in settings where the adversary has some idea of which group it wants to attack, but may have some flexibility on exactly which users it includes in the group.

Our Final Construction. Finally, we give another NIKE construction which further improves on the security attained in Theorem 1, at the cost of a slightly stronger group-based assumption:

Theorem 2 (Informal). Assuming polynomial iO and the DDH-powers assumption, there exist an adaptively secure multiparty NIKE where the group size and number of corruptions is bounded, but otherwise the number of honest and malicious users unbounded.

We note that bounding the number of corruptions is very natural, and has arisen in many cryptographic settings under the name "bounded collusions." Examples include traitor tracing, Broadcast encryption, identity-based encryption and its generalizations to functional encryption, to name a few. Bounded collusions are often seen as a reasonable relaxation, and in many cases are stepping-stones to achieving full security. We view bounded collusion security for NIKE similarly, except that in some ways, bounded corruptions for NIKE is even stronger than bounded collusions, in that we allow the NIKE adversary to control an unbounded number of users, only limiting the number of users that can be corrupted adaptively.

In our construction, we no longer go through 1-SF-PRFs explicitly, but instead open up the layers of abstraction that gave Theorem 1 and make several crucial modifications to the overall protocol. The main technical challenge is that, in our proof of security for 1-SF-PRFs, we must hard-code all prior queries into each secret key. In the obtained NIKE scheme, this means hard-coding all the keys of users generated by the challenger. But as the number of hard-coded users can never be more than the bit-length of the secret key, this limits the number of honest users.

In our solution, we no longer explicitly hardcode the challenger-generated users, but switch to a hybrid where they are generated with a trigger. Only the obfuscated programs can detect this trigger so that they look like honestly generated users, and it moreover is impossible for the adversary to generate users with the trigger. By a delicate hybrid argument, we are able to mimic the security proof above using these triggers instead of the explicitly hard-coded public keys. See Section for details.

Note that the DDH-powers assumption is a q-type assumption, but this can be proved from a single assumption in the composite order setting, assuming appropriate subgroup decision assumptions.

2 Preliminaries

2.1 Multiparty NIKE

Here, we define the version of NIKE that we will be considering.

Definition 1 (Multiparty NIKE, Syntax). A multiparty NIKE scheme with bounded honest users is a pair (Pub, KeyGen) with the following syntax:

pub($1^\lambda$, $1^\ell$, $1^n$, $1^c$) takes as input the security parameter $\lambda$, an upper bound n on the number of honest users, an upper bound $\ell$ on the number of users in a set, and an upper bound c on the number of corruptions. It outputs a public key pk and secret key sk.

KeyGen(U, sk) takes as input a list U of $t \leq \ell$ public keys, plus the secret key for one of the public keys. It outputs a shared key. We have the following correctness guarantee: for any $\ell$, n, c>0, t∈[$\ell$] and any i, j∈[t], $Pr$[KeyGen($\{pk_1, \ldots, pk_t\}, sk_i$)=Key Gen($\{pk_1, \ldots, pk_t\}, sk_j$)]≥1−negl where the probability is over ($pk_i$, $sk_i$)←Gen($1^\lambda$, $1^\ell$, $1^n$, $1^c$) for i=1, ..., t.

2.2 Constrained PRFs

A special case of bit-fixing PRFs. Here, we define a type of bit-fixing PRF.

Definition 2 (1-Symbol-Fixing PRF, Syntax). 1-SF-PRF is a tuple (Gen, Eval, Constr, EvalC) with the following syntax:

Gen($1^\lambda$, $1^{|\Sigma|}$, $1^\ell$) takes as input a security parameter $\lambda$, an alphabet size $|\Sigma|$, and an input length $\ell$, all represented in unary. It outputs a key k.

Eval(k, x) is the main evaluation algorithm, which is deterministic and takes as input a key k and x∈$\Sigma^\ell$, and outputs a string.

Constr(k, i, z) is a potentially randomized constraining algorithm that takes as input a key k, an index i∈[$\ell$], and symbol z∈Σ. It outputs a constrained key $k_{i,z}$.

EvalC($k_{i,z}$, x) takes as input a constrained key $k_{i,z}$ for an index/symbol pair (i, z), and an input x. It outputs a string. We have the correctness guarantee that:

$$EvalC(k_{i,z}, x) = \begin{cases} \perp & \text{if } x_i \neq z \\ Eval(k, x) & \text{if } x_i = z \end{cases}$$

Definition 3 (1-SF-PRF, Adaptive Security). Consider the following experiment with an adversary $\mathcal{A}$:

$\mathcal{A}$ on input $1^\lambda$, produces $1^{|\Sigma|}$, $1^\ell$. The challenger runs k←Gen($1^\lambda$, $1^{|\Sigma|\star}$, $1^\ell$). It returns nothing to $\mathcal{A}$.

Then $\mathcal{A}$ can adaptively make the following types of queries:

Constrain. $\mathcal{A}$ sends i, z, and receives $k_{i,z}$←Constr(k, i, z). The challenger records each (i, z) in a table C. There is no limit to the number of constrain queries.

Eval. $\mathcal{A}$ sends an input x, and receives Eval(k, x). The challenger records each x in a table E. There is no limit to the number of Eval queries.

Challenge. $\mathcal{A}$ can make a single challenge query on an input x*∈$\Sigma^\ell$. The challenger flips a random bit b∈{0, 1} and replies with y*=$y_b$, where $y_0$=Eval(k, x) and $y_1$ is sampled uniformly and independently.

If at any time, x*$_i$=z for some (i, z)∈C or x*∈E, the challenger immediately aborts and outputs a random bit.

The adversary outputs bit b'. The challenger outputs 1 if b=b', 0 otherwise.

A 1-SF-PRF is adaptively secure if, for all PPT adversaries $\mathcal{A}$, there exists a negligible function ϵ such that the challenger outputs 1 with probability at most $$\frac{1}{2} + \epsilon.$$

It is adaptively secure without Eval queries if this holds for all $\mathcal{A}$ that make no Eval queries.

A 1-SF-PRF scheme is said to be adaptively secure against unique-query adversaries if the above holds for any adversary A that makes unique constrained key queries to the challenger.

2.3 Puncturable Pseudorandom Deterministic Encryption

Below, we present the notion of puncturable pseudorandom deterministic encryption (PPDE) introduced by prior work. In a PPDE scheme, we have a symmetric key deterministic encryption algorithm, and a decryption algorithm. Additionally, the private key can be punctured at any point. Given a key punctured at in, the encryption of m is indistinguishable from a uniformly random string. The following syntax and definitions are taken from the prior work.

Let $\mathcal{M}$ be the message space. A pseudorandom puncturable deterministic encryption scheme (or PPDE scheme) for $\mathcal{M}$ and ciphertext space $\mathcal{CT} \subseteq \{0,1\}^{\ell}$ (for some polynomial $\ell$), is defined to be a collection of four algorithms.

PPDE.Setup($1^{\lambda}$) takes the security parameter and generates a key K in keyspace $\mathcal{K}$. This algorithm is randomized.

DetEnc(K, m) takes a key K∈ $\mathcal{K}$ and message m∈ $\mathcal{M}$ and produces a ciphertext CT∈ $\mathcal{CT}$. This algorithm is deterministic.

Dec(K, CT) takes a key K∈ $\mathcal{K}$ and ciphertext CT∈ $\mathcal{CT}$ and outputs m∈ $\mathcal{M} \cup \{\perp\}$. This algorithm is deterministic.

Puncture$_{PPDE}$(K, m) takes a key K∈ $\mathcal{K}$ and message m∈ $\mathcal{M}$ and produces a punctured key K{m}∈ $\mathcal{K}$ and y∈ $\{0,1\}^{\ell}$. This algorithm may be randomized.

Correctness A PPDE scheme is correct if it satisfies the following conditions.

1. Correct Decryption For all messages m and keys K← $\mathcal{K}$, we require

Dec(K,DetEnc(K,m))=m.

2. Correct Decryption Using Punctured Key For all distinct messages m, for all keys K← $\mathcal{K}$, $$Pr\left[\begin{array}{c}\#\{CT: Dec(K\{m\}, CT) \neq Dec(K, CT)\} > 1 | \\ (K\{m\}, y) \leftarrow \text{Puncture}_{PPDE}(K, m)\end{array}\right]$$

is less than negl($\lambda$), where all probabilities are taken over the coins of Puncture$_{PPDE}$.

3. For all messages m*∈ $\mathcal{M}$ and keys K← $\mathcal{K}$, $\{y | (K\{m^*\}, y) \leftarrow \text{Puncture}_{PPDE}(K,m^*)\} \approx U_{\ell}$ where $U_{\ell}$ denotes the uniform distribution over $\{0,1\}^{\ell}$.

Definition 4. A PPDE scheme is selectively secure if no PPT algorithm $\mathcal{A}$ can determine the bit b in the following game except with probability negligibly close to ½:

1. $\mathcal{A}$ chooses a message m* to send to the challenger.
2. The challenger chooses K←PPDE.Setup($1^{\lambda}$) and (K{m*}, y)←Puncture$_{PPDE}$(K,m*) and CT=DetEnc (K,m*). Next, it chooses b←{0, 1}. If b=0, it sends (K{m*}, (CT, y)); otherwise it sends (K{m*}, (y, CT)).
3. $\mathcal{A}$ outputs a guess b' for b.

2.4 DDH-Powers Assumption

Definition 5. Let $\mathbb{G}$ be a group of order p. The k-DDH-powers assumption states that the following distributions are computationally indistinguishable:

$\mathcal{D}_1 = \{(g, g^a, g^{a^2}, g^{a^k}, g^{a^{k+1}}) : g \leftarrow \mathbb{G}, a \leftarrow \mathbb{Z}_p\}$ $\mathcal{D}_2 = \{(g, g^a, g^{a^2}, g^{a^k}, T) : g \leftarrow \mathbb{G}, a \leftarrow \mathbb{Z}_p, T \leftarrow \mathbb{G}\}$

3 Enhancing Multi-Party NIKE

In this section, we give some compilers for multi-party NIKE, which allow for simplifying the task of designing new NIKE protocols built from iO. Our ultimate goal is to show that one can safely ignore Shared Key and Register Malicious User queries, and also employ a trusted setup. Our compilers then show how to lift such a scheme into one secure under all types of queries and without a trusted setup.

3.1 Achieving Adversarial Correctness

First, we show how to convert any NIKE that is perfectly correct into one with adversarial correctness. While adversarial correctness is not a particular design goal in multiparty NIKE, this step will be needed in order to apply our later compilers.

Theorem 3. Assume there exists a multi-party NIKE with perfect correctness, potentially in the crs model. Assume additionally there exists a NIZK. Then there exists a multi-party NIKE with both perfect and adversarial correctness in the crs model. If the perfectly correct scheme has unbounded honest users, corruptions, and/or set size, then so does the resulting adversarially correct scheme.

Theorem 3 follows from a standard application of NIZKs, and is similar to a theorem used in the context of two-party NIKE.

3.2 Removing the CRS

Next, we use iO to remove the common reference string (crs) from any multi-party NIKE. A side-effect of this transformation, however, is that we only achieve security without Register Malicious User queries.

Theorem 4. Assuming there exists iO an adaptively secure multi-party NIKE in the common reference string (crs) model, then there also exists adaptively multi-party NIKE in the plain model that is secure without Register Malicious User queries. If the crs scheme has unbounded honest users, corruptions, and/or set size, or has perfect and/or adversarial correctness, or only has secure without X queries for some X, then the same is true of the resulting plain model scheme.

Theorem 4 formalizes the ad hoc techniques for removing the CRS in iO-based constructions starting from Boneh and Zhandry. The technique works by having each user separately run the trusted setup. Then each group selects (deterministically) a distinguished user, whose trusted setup is used to actually derive the shared key. The main limitation of this technique is that it does not preserve security under Register Malicious User queries, which will be fixed in the compiler in the next subsection. We now give the proof of Theorem 4.

3.3 Adding Shared Key Queries

The final compiler generically convert a NIKE scheme whose security does not support shared key queries into one that does.

Theorem 5. Assume there exists a multi-party NIKE with adversarial correctness and adaptive security without Shared Key or Register Malicious User queries. Then there exists a multi-party NIKE with adversarial correctness and adaptive security (with Shared Key and Register Malicious User queries). If the original scheme is also perfectly correct, then so is the resulting scheme. If the original scheme has unbounded honest users, corruptions, and/or set size, then so does the resulting scheme. The resulting scheme is in the CRS model if and only if the original scheme is.

Note the requirement that the underlying NIKE protocol have adversarial correctness. The proof of Theorem 5 exploits the structure of multiparty NIKE, together with combinatorial tricks, to ensure that the reduction can answer all Shared Key queries (even on sets involving malicious users) while not being able to answer the challenge query. We now give the proof of Theorem 5.

Proof. The rough idea is to randomly give the reduction some of the secret keys for users. We give the reduction enough secret keys so that with non-negligible probability it will be able to answer all shared key queries, while simultaneously being unable to answer the challenge query.

There are several difficulties getting this to work. First, when the adversary makes an shared key query on a set of users that includes a maliciously-generated user, correctness is no longer guaranteed. This means different users may output different shared keys, even for the same set. This in turn means the extra secret keys we gave the reduction may not answer correctly. We fix this by assuming the underlying NIKE is adversarially correct.

A more important difficulty is that is that the shared key queries can be highly correlated with the challenge query, potentially differing on only a single user. In order to be able to answer the shared key query but not the challenge query, we must give out the secret key for exactly the differing user, which we do not know in advance. We could of course guess the differing user and incur a polynomial loss in the security reduction, but this will compound over all the shared key queries, resulting in an exponential loss.

Our solution leverages the functionality of multi-party NIKE. Every user will actually contain many sub-users. When computing the shared key for a group of users, a collection of each user's sub-users will be selected, and the key will be computed for the union of all sub-users. The collections of sub-users will be chosen so that each group will yield collections that are "far" from each other. This gives us many possibilities for giving out secret keys without compromising the challenge.

We now give the construction and proof of security in more detail. All the proofs are essentially identical, so we prove the bounded case without a crs. Let (Pub', KeyGen') be a multiparty NIKE scheme. Let H be a collision resistant hash function, with hashing key space $\mathcal{H}$ and range $\mathcal{Y}$. Let $C \subseteq \Sigma^m$ be a code of minimum distance d, such that $\Sigma$ is a polynomial-sized alphabet, and $|C| \geq |\mathcal{H}| \times |\mathcal{Y}|$. Let Map: $\mathcal{H} \times \mathcal{Y} \to C$ be an arbitrary efficiently computable injective mapping.

Our new multi-party NIKE scheme (Pub, KeyGen) is given as follows:

Pub($1^\lambda$, $1^\ell$, $1^n$, $1^c$): Sample a random hashing key hk$\in \mathcal{H}$. Let n'=n×m, $\ell'=\ell \times |\Sigma| \times m$, c'=c×$\Sigma$. For each i$\in$[m], z$\in \Sigma$, run (pk$_{i,z}$, sk$_{i,z}$)←Pub'($1^\lambda$, $1^{\ell'}$, $1^{n'}$, $1^{c'}$). Output pk=(hk, (pk$_{i,z}$)$_{i,z}$), sk=(sk$_{i,z}$)$_{z \in \Sigma}$.

KeyGen(U, sk): Write U={pk$_1$, . . . , pk$_t$} and write pk$_j$=(hk$_j$, (pk$_{j,i,z}$)$_{i,z}$). Let j* be such that pk$_{j*}$ is the minimal element in U for some ordering of public keys. Let y←H(hk$_{j*}$, U) and c=Map(hk$_{j*}$, y). Let U$_j$=(pk$_{j,i}$, c$_j$)$_{i\in[m]}$. Output KeyGent'($\cup_{j\in[t]} U_j$, sk$_{c_j}$).

One final piece remains: actually computing $p_{L,c^*}(u, r)$. Unfortunately, it is not necessarily true that the probabilities can be exactly computed efficiently. This is analogous to the artificial abort of Waters. As in the prior work, we instead have $\mathcal{A}'$ estimate $p_{L,c^*}$ to within an error much less than $p_{min}\epsilon$ by simply sunning poly($1/p_{min}\epsilon, \lambda$) trials of the process defining $p_{L,c^*}$. This will introduce an error $\ll p_{min}\epsilon$ into the simulation, still resulting in a non-negligible success probability. This completes the proof.

3.4 Putting it all Together

We can combine Theorems 3, 4, and 5 together, to get the following corollary:

Corollary 1. Assume there exists iO and perfectly correct multi-party NIKE in the crs model with adaptive security without Shared Key or Register Malicious User queries. Then there exists perfectly correct (and also adversarially correct) multi-party NIKE in the plain model with adaptive security (under both Shared Key and Register Malicious User queries). If the original scheme has unbounded honest users, corruptions, and/or set size, then so does the resulting scheme.

Corollary 1 shows that, for multiparty NIKE from iO, it suffices to work in the CRS model and ignore Shared Key and Register Malicious User queries.

4 The Equivalence of Multiparty NIKE and 1-SF-PRF

In this section, we show that NIKE is equivalent to a 1-SF-PRF.

4.1 From Multiparty NIKE to 1-SF-PRF

Let (Setup, Pub, KeyGen) be a multiparty NIKE. We construct a 1-SF-PRF (Gen, Eval, Constr, EvalC) as follows:

Gen($1^\lambda$, $1^{|\Sigma|}$, $1^\ell$): let c=n:=$\ell * |\Sigma|$. Run crs←Setup($1^\lambda$, $1^\ell$, $1^n$, $1^c$). In other words, we set the maximum number of users in a group to be $\ell$, and the total number of users (and allowed corruptions) to be n×$|\Sigma|$. For z$\in \Sigma$, i$\in [\ell]$, run (pk$_{i,z}$, sk$_{i,z}$)←Pub(crs). Set k={(pk$_{i,z}$, sk$_{i,z}$)}$_{i\in[\ell],z\in\Sigma}$.

Eval(k, x): run KeyGen(crs, pk$_{1,x_1}$, . . . , $pk_{\ell,x_\ell}$, 1, sk$_{1,x_1}$)

Constr(k, i, z): output k$_{i,z}$=({pk$_{i',z'}$}$_{i'\in[\ell],z'\in\Sigma}$, sk$_{i,z}$).

EvalC(k$_{i,z}$, x): Output KeyGen(crs, pk$_{1,x_1}$, . . . , $pk_{\ell,x_\ell}$, i, sk$_{i,z}$)

Theorem 6. If (SetupPub, KeyGen) is an adaptively secure multiparty NIKE without Register Malicious User queries in the CRS model, then (Gen, Eval, Constr, EvalC) is an adaptively secure 1-SF-PRF. If (SetupPub, KeyGen) has security without Shared Key queries, then (Gen, Eval, Constr, EvalC) has security without Eval queries.

The proof is straightforward, and we only sketch it here. The (SetupPub, KeyGen) adversary simply runs the supposed adversary for (Gen, Eval, Constr, EvalC), making Corrupt User queries to answer any Constrain query in the obvious way, and making a Shared Key query to answer any Eval query.

4.2 From 1-SF-PRF to Special Constrained PRF

Here, we define an intermediate notion of constrained PRF, which enhances a 1-SF-PRF. The idea is that the symbol space $\Sigma$ is now exponentially large. However, at the beginning a polynomial-sized set S is chosen, and a punctured key is revealed that allows for evaluating the PRF on any point not in S. The points in S then behave like the symbol space for a plain 1-SF-PRF, where it is possible to generate keys that fix any given position to some symbol in S.

Looking ahead to our NIKE construction, the set S will correspond to the public keys of the honest users of the system, while the rest of $\Sigma$ will correspond to maliciously-generated keys. The abstraction of our special constrained PRF in this section is the missing link to formalize the connection between 1-SF-PRFs and NIKE as outlined in Section 1.

Definition 6 (Special Constrained PRF, Syntax). SC-PRF is a tuple of algorithms (Gen, Eval, Punc, EvalP, Constr, EvalC) with the following syntax:

Gen($1^\lambda$, $|\Sigma|$, $1^\ell$, $1^n$) takes as input a security parameter $\lambda$, an alphabet size $|\Sigma|$, an input length $\ell$, and a maximal set size n. Here, $|\Sigma|$ is represented in binary (thus allowing exponential-sized $\Sigma$), but everything else in unary.

Eval(k, x) is the main evaluation algorithm, which is deterministic and takes as input a key k and $x \in \Sigma^\ell$, and outputs a string.

Punc(k, S) is a randomized puncturing algorithm that takes as input a key k and set $S \subseteq \Sigma$ of size at most n. It outputs a punctured key $k_S$.

EvalP($k_S$, x) takes as input an $x \in \Sigma^\ell$, and outputs a value such that $$EvalP(k_S, x) = \begin{cases} \perp & \text{if } x \in S^n \\ Eval(k, x) & \text{if } x \notin S^n \end{cases}$$

Constr(k, S, i, z) is a potentially randomized constraining algorithm that takes as input a set S, a key k, and index $i \in [\ell]$, and symbol $z \in S$. It outputs a constrained key $k_{S,i,z}$.

EvalC($k_{S,i,z}$, x) takes as input a constrained key $k_{S,i,z}$ for an set/index/symbol triple (S, i, z), and input x. It outputs a string. The correctness guarantee is:

$$EvalC(k_{S,i,z}, x) = \begin{cases} \perp & \text{if } x_i \neq z \\ Eval(k, x) & \text{if } x_i = z \end{cases}$$

Definition 7 (Special Constrained PRF, Adaptive Security). Consider the following experiment with an adversary $\mathcal{A}$:

$\mathcal{A}$ on input $1^\lambda$, outputs $|\Sigma|$, $1^\ell$, $1^n$, and set S of size at most n. The challenger runs $k \leftarrow$ Gen($1^\lambda$, $|\Sigma|$, $1^\ell$, $1^n$) and $k_S \leftarrow$ Punc(k, S). It sends $k_S$ to $\mathcal{A}$.

Then $\mathcal{A}$ can adaptively make the following types of queries:

Constrain. $\mathcal{A}$ sends i, z, and receives $k_{S,i,z} \leftarrow$ Constr(k, S, i, z). The challenger records each (i, z) in a table C.

Eval. $\mathcal{A}$ sends an input x, and receives Eval(k, x). The challenger records each x in a table E. There is no limit to the number of Eval queries.

Challenge. $\mathcal{A}$ can make a single challenge query on an input $x^* \in S^\ell$. The challenger flips a random bit $b \in \{0, 1\}$ and replies with $y^* = y_b$, where $y_0 = $ Eval(k, x) and $y_1$ is sampled uniformly and independently.

If at any time, $x^*_i = z$ for some (i, z) $\in$ C or $x^* \in$ E, the challenger immediately aborts and outputs a random bit.

The adversary outputs bit b'. The challenger outputs 1 if b=b', 0 otherwise.

A Special Constrained PRF is adaptively secure if, for all PPT adversaries $\mathcal{A}$, there exists a negligible function $\epsilon$ such that the challenger outputs 1 with probability at most $$\frac{1}{2} + \epsilon.$$

Theorem 7. If 1-SF-PRFs exist, then so do Special Constrained PRFs.

The proof of Theorem 7 use purely combinatorial techniques. The idea is to set the symbol space $\Sigma$ for the Special Constrained PRF to be codewords over the symbol space for the 1-SF-PRF, where the code is an error correcting code with certain properties.

4.3 From Special Constrained PRF to Multiparty NIKE with Setup

As a warm up, we construct multiparty NIKE in the common reference string model. We will need the following ingredients:

Definition 8. A single-point binding (SPB) signature is a quadruple (Gen, Sign, Ver, Gen Bind) where Gen, Sign, Ver satisfy the usual syntax of a signature scheme. Additionally, we have the following:

(vk, $\sigma$) $\leftarrow$ GenBind($1^\lambda$, m) takes as input a message m, and produces a verification key vk and signature $\sigma$.

For any messages m, m'$\neq$m, with overwhelming probability over the choice of (vk, $\sigma$) $\leftarrow$ GenBind($1^\lambda$, m), Ver (vk, m', $\sigma'$)=$\perp$ for any $\sigma'$. That is, there is no message m'$\neq$m where there is a valid signature of m' relative to vk.

For any m, GenBind($1^\lambda$, m) and (vk, Sign(sk, m)) are indistinguishable, where (vk, sk)$\leftarrow$Gen($1^\lambda$). This property implies that Ver(vk, m, $\sigma$) accepts, when (vk, $\sigma$)$\leftarrow$GenBind($1^\lambda$, m).

Definition 9. A multi-point binding (MPB) hash function is a triple (Gen, H, GenBind) where:

Gen($1^\lambda$, $1^n$) takes as input the security parameter $\lambda$, and an upper bound n on the number of inputs to bind. It produces a hashing key hk.

H(hk, x) deterministically produces a hash h.

GenBind($1^\lambda$, $1^n$, S*) takes as input $\lambda$, n, and also a set S* of inputs of size at most n. It produces a hashing key hk with the property that, with overwhelming probability over the choice of hk$\leftarrow$GenBind($1^\lambda$, $1^n$, S*), for any $x \in$ S* and any x'$\neq$x (which may or may not be in S*), H(hk, x)$\neq$H(hk, x').

For any n and any set S* of size at most n, (S*, Gen($1^\lambda$, $1^n$)) is computationally indistinguishable from (S*, Gen Bind($1^\lambda$, $1^n$, S*)).

A single-point binding (SPB) hash function is as above, except we fix n=1.

We will rely on the following Lemmas from Guan, Wichs, and Zhandry:

Lemma 1. Assuming one-way functions exist, so do single-point binding signatures.

Lemma 2. Assuming one-way functions and iO exist, so do single-point binding hash functions.

We now give an adaptation of Lemma 2 to achieve multi-point binding hashes:

Lemma 3. Assuming one-way functions and iO exist, then so do multi-point binding hash functions.

We use single/multi-point binding hash functions in order to statistically bind to an input m, (or set of inputs S*) with a hash that is much smaller than m. Such hash functions will contain many collisions, but the point binding guarantee means that there is no collision with m, or S*. The SPB signature is used for similar reasons.

Our NIKE Construction. We don't bound collusion queries c (that is, the number of corruption queries), but bound the number of honest users, which implicitly bounds the collusion queries at n.

Setup($1^\lambda$, $1^\ell$, $1^n$): Run hk←$\text{Gen}_{Hash}(1^\lambda, 1^n)$. Let $\mathcal{Y}$ be the range of H. Also sample k←$\text{Gen}_{PRF}(1^\lambda, |\mathcal{A}|, 1^\ell, 1^n)$. Let $\text{KGen}_{hk,k}$ be the program given in below, padded to the maximum size, and let $\widehat{\text{KGen}}$=iO(K-$\text{Gen}_{hk,k}$). Output crs=$\widehat{\text{KGen}}$.

Pub(crs): Sample a random message m and run (vk, σ)←$\text{GenBind}_{Sig}(1^\lambda, m)$. Output pk=vk and sk=(m, σ).

KeyGen(crs, $pk_1, \ldots, pk_\ell$, i, $sk_i$): assume the $pk_j$ are sorted in order of increasing pk according to some fixed ordering; if the $pk_j$ are not in order sort them, and change i accordingly. Write crs=$\widehat{\text{KGen}}$, $pk_j$=$vk_j$ and $sk_i$=($m_i, \sigma_i$). Then output $\widehat{\text{KGen}}$($vk_1, \ldots, vk_\ell$, i, $m_i, \sigma_i$).

The program $\text{KGen}_{hk,k}$ may be stated as follows:

Inputs: $vk_1, \ldots, vk_\ell$, i, $m_i, \sigma_i$
Constants: hk, k
1. If the $vk_i$ are not sorted in increasing order, immediately abort and output ⊥.
2. If Ver($vk_i, m_i, \sigma_i$) rejects, immediately abort and output ⊥.
3. For each $t\in[\ell]$, let $u_t$=H(hk, $vk_t$).
4. Output $\text{Eval}_{PRF}$(k, $u_1\|u_2\|\ldots\|u_\ell$)

5 Construction of 1-SF-PRFs

The previous section worked to distill adaptively secure NIKE to the more basic primitive of constrained PRFs for one symbol fixing. While these transformations simplify the problem, the central barriers to proving adaptive security still remain. In this section we address these head on.

Let's review the main issues for adaptivity. Consider an adversary $\mathcal{A}$ that first makes several constrained key queries ($\text{index}_1$, $\text{sym}_1$), . . . , ($\text{index}_Q$, $\text{sym}_Q$). Next the $\mathcal{A}$ submits a challenge input x* such that x*$_i$≠z for any pre-challenge key query (i, z) and receives back the challenge output from the challenger. Before submitting its guess, $\mathcal{A}$ will first perform some consistency checks on the constrained keys it received. For example, it can run the evaluation algorithm on multiple points that are valid for different sets of constrained keys and verify that it receives the same output from each execution. If not, it aborts and refuses to submit its guess.

Dealing with such an attacker is difficult for multiple reasons. First, a reduction algorithm cannot simply guess x* or which index/symbol pairs will be queried without an exponential loss. Second, it cannot issue constrained keys that are deviate much from each other less this be detected by $\mathcal{A}$'s consistency checks.

We overcome these issues with a proof strategy where the challenger gradually issues constrained keys that deviate from a canonical PRF which is used to evaluate on the challenge input. However, we endeavor to keep all subsequent issued keys consistent with any introduced deviation so that this will avoid being detected.

Diving deeper our construction will use constrained keys which are obfuscated programs. Initially, the obfuscated program will simply check if an input x is consistent with the single symbol fixing of the key. If so, it evaluates the canonical PRF which is a Naor-Reingold style PRF.

The proof will begin by looking at the first key that is issued by the challenger for some query ($\text{index}_1$, $\text{sym}_1$). For this key the obfuscated program will branch off and evaluate any inputs x where $x_{index_1}$=$\text{sym}_1$ in a different, but functionally equivalent way to the canonical PRF. By the security of iO this will not be detected. Moreover, this alternative evaluation for when $x_{index_1}$=$\text{sym}_1$ will be adopted by all further issued keys. Once this alternative pathway is set for all keys, we can change the evaluation on such inputs to be inconsistent with the canonical PRF, but mutually consistent with all issued keys. This follows from the DDH assumption. The proof can then proceed to the transforming the second issued key in a similar way such that there is a separate pathway for all inputs x where $x_{index_2}$=$\text{sym}_2$. The one exception is that the second and all future keys will give prioritization to the first established pathway whenever we have an input x where both $x_{index_1}$=$\text{sym}_1$ and $x_{index_2}$=$\text{sym}_2$.

The proof continues on in this way where each new key issued will establish an alternative evaluation which will be used except when it is pre-empted by an earlier established alternative. In this manner the constrained keys issued will always be mutually consistent on inputs, even while the gradually deviate from the canonical PRF. Finally, at the end of the proof all issued keys will always used some alternative pathway for all evaluations. At this point we can use indistinguishability obfuscation again to remove information about the canonical PRF from the all obfuscated programs since it is never used. With this information removed no attacker can distinguish a canonical PRF output from a random value.

We remark that in order to execute our proof strategy, our initial obfuscated program must be as large as any program used in the proof. In particular, it must be large enough to contain an alternative evaluation programming for all corrupted keys. Thus our constrained PRF keys must grow in size proportional to $\ell \cdot |\Sigma|$ and our resulting NIKE is parameterized for a set number of collusions.

5.1 Construction

Gen($1^\lambda$, $\Sigma$, $1^\ell$): The key generation algorithm first runs $\mathcal{G}(1^\lambda)$ to compute (p, $\mathbb{G}$). Next, it chooses v←$\mathbb{G}$, exponents $e_{j,w}$←$\mathbb{Z}_p$ for each j∈[$\ell$], w∈$\Sigma$. The PRF key K consists of (v, $\{e_{j,w}\}$).

Eval(K, x): Let K=(v, $\{e_{j,w}\}$) and x=($x_1, \ldots, x_\ell$)∈$\Sigma^\ell$. The PRF evaluation on input x is $v^t$, where t=($\Pi_{j\geq n} e_{j,x_j}$).

Constr(K, i, z): The constrained key is an obfuscation of the ConstrainedKey$_{K,i,z}$ program (defined below). The program is sufficiently padded to ensure that its description is of the same size as the programs ConstrainedKeyAlt, ConstrainedKeyAlt' and ConstrainedKeyEnd.

It outputs $K_{i,z}$←iO($1^\lambda$, ConstrainedKey$_{K,i,z}$) as the constrained key.

EvalC($K_{i,z}$, x): The constrained key $K_{i,z}$ is an obfuscated program. The evaluation algorithm outputs $K_{i,z}$(x).

The ConstrainedKey$_{K,i,z}$ program may be stated as follows:

Input: x=($x_1, \ldots, x_\ell$)∈$\Sigma^\ell$
Constants: Group element v
Exponents $\{e_{j,w}\}_{j\subset[\ell], w\subset\Sigma}$
Constraining index/symbol i∈[$\ell$], z∈$\Sigma$
1. If $x_i$≠z output ⊥.
2. Compute t=($\Pi_{j\leq \ell} e_{j,x_j}$).
3. Output $v^t$.

6 NIKE Scheme with Unbounded Honest Users

Construction Overview: In this scheme, our construction supports an unbounded number of honest users, but at most c corruptions. The setup algorithm takes this corruption bound c, together with a bound $\ell$ on the number of parties that can derive a shared key. It outputs a crs, which is an obfuscated program that will be used for generating the shared key. The program takes as input $\ell$ public keys and one secret key. Each public key consists of a random string s and a signature scheme's verification key vk. The corresponding secret key is a (random) message m and a signature $\sigma$ on m. The crs program, on input $pk_1, \ldots, pk_\ell$ and $sk_i = (m_i, \sigma_i)$, first checks that $\sigma_i$ is a valid signature on $m_i$. Next, it computes a hash of each of the $\ell$ public keys (that is, $u_j$=Hash(pk, $pk_j$)). The crs program also has a PRF key $K_{main}$ hardwired, using which it computes a pseudorandom integer $t_j = F(K_{main}, u_j)$. It finally computes the product of all these integers (let t denote the product of $t_1, t_2, \ldots, t_\ell$), and outputs $v^t$, where v is a random group element hardwired in the program.

The 'publish' algorithm Pub is used to sample a public key and the corresponding secret key. It chooses a random message m, then samples a verification key vk and a signature $\sigma$ that is binding to m (using the $GenBind_{sig}$ algorithm). It then chooses a random string s. The public key is (s, vk), and the corresponding secret key is (m, $\sigma$).

The key generation algorithm simply takes $\ell$ public keys, one secret key, and runs the crs program to sample the shared key.

Construction: Let $\ell_{ct}$ denote the size of ciphertexts output by the PPDE scheme with message space $\{0, 1\}^\lambda$. Let $\ell_{hash}$ denote the output length of the hash function (note that the output length depends only on $\lambda$, and does not depend on the message space for the hash function). Let $\ell_m$ denote the size of message space of the signature scheme, and $\ell_{vk}$ the size of the verification key output by $Gen_{Sign}$. Finally, let $\ell_{hk}$ denote the size of the hash key output by $Gen_{Hash}$.

Setup($1^\lambda$, $1^\ell$, $1^c$): The setup algorithm takes as input the security parameter $\lambda$, a bound c on the number of corrupt users and a bound $\ell$ on the number of parties that can derive a shared key.

Run hk←$Gen_{Hash}(1^\lambda, 1)$. We only need single-point binding hash function for this construction. Let $\mathcal{Y}$ be the range of H. Also sample $K_{main}$←$Gen_{PRF}(1^\lambda, |\mathcal{Y}|)$. Let $KGen_{hk,K_{main},v}$ be the program given below, and let $\widetilde{KGen}$=iO($KGen_{hk,K_{main},v}$). Output crs=$\widetilde{KGen}$.

Pub(crs): Sample a random message m←$\{0, 1\}^{\ell_m}$ and run (vk, $\sigma$)←$GenBind_{Sig}(1^\lambda, m)$. Choose s←$\{0, 1\}^{\ell_{ct}}$, and output pk=(s, vk) and sk=(m, $\sigma$).

KeyGen(crs, $pk_1, \ldots, pk_\ell$, i, $sk_i$): let crs=$\widetilde{KGen}$, $pk_j=(s_j, vk_k)$ for all j∈[$\ell$], and $sk_i=(m_i, \sigma_i)$. The algorithm outputs $\widetilde{KGen}(pk_1, \ldots, pk_\ell, i, m_i, \sigma_i)$.

The program $KGen_{hk,K_{main},v}$ may be stated as follows:
Inputs: $pk_1=(s_1, vk_1), \ldots, pk_\ell=(s_\ell, vk_\ell)$, i, $m_i$, $\sigma_i$
Constants: hk, $K_{main}$, v 1. If Ver($vk_i, m_i, \sigma_i$) rejects, immediately abort and output ⊥.
2. For each j∈[$\ell$], let $u_j$=H(hk, ($s_j, vk_j$)).
3. For each j∈[$\ell$], let $t_j=F(K_{main}, u_j)$.
4. Compute t=$\Pi_j t_j$ and output $v^t$.

System Implementations

With reference to FIG. 1, the disclosed systems, method, and computer-readable media with instructions for adaptively secure multiparty non-interactive key exchange can be configured for:

establishing a group of parties to derive a shared secret key;
executing a setup routine at a trusted third party, the setup routine comprising:
  creating a hash key hk for a hash function H;
  sampling a random key k;
  accessing a specification of a signature scheme;
  generating a set of executable instructions based on: a set of verification keys, an index to one of the verification keys, a message, and a signature, wherein the executable instructions are configured for:
    (1) verifying that the signature is valid for the message for the indexed verification key according to the specification of the signature scheme;
    (2) hashing each of the verification keys in the set using H and hk to generate a corresponding set of output hashes s;
    (3) combining the set of output hashes s together;
    (4) evaluating a pseudorandom function on the combined set of output hashes s using the key k;
  obfuscating the generated set of executable instructions;
executing a publication routine at each member of the group, the publication routine comprising:
  sampling a uniformly random message m;
  sampling a verification key vk for the signature scheme and a signature a on the message m;
  setting a public key to be the verification key vk;
  broadcasting the public key to each other member of the group;
  setting a secret key to be a combination of the message m and the signature $\sigma$;
executing a key generation routine at each member of the group, the key generation routine comprising:
  receiving as inputs from another member of the group: the obfuscated set of executable instructions, a set of public keys, an index into the public keys, and a secret key;
  parsing the secret key as a message and a signature;
  executing the obfuscated set of executable instructions on the set of public keys, the index into the public keys, the message, and the signature to generate the shared secret key,
  wherein each of the set of public keys is a verification key; and
distributing the set of public keys to the group of parties.
Further embodiments can include generating the pseudorandom function by:
  receiving a specification for a first pseudorandom function F and a group G with a generator g;
  receiving input key k;
  receiving the set of output hashes s as an input string s;
  parsing the input string s as a list of component hashes $h_1, \ldots, h_l$;
  for each i=1, ..., l, evaluate F on k and $h_i$ to obtain $t_i$;
  generating a string x by operations on $t_1, \ldots, t_l$ with each other;
  calculating an exponentiation $g^x$; and
  outputting result of the exponentiation as the pseudorandom function.

In further embodiments, the pseudorandom function is further defined by:
  a randomized puncturing algorithm that outputs a punctured key;
  a first evaluation algorithm configured to check for first predetermined properties in the set of output hashes;

a potentially randomized constraining algorithm configured to output a constrained key; and a second evaluation algorithm configured to check for second predetermined properties in the set of output hashes.

With reference to FIG. 1 and to the configurations described above and elsewhere herein, Party 1 (101), Party 2 (102), and Party 3 (103) operate non-interactively to derive a key 104. To accomplish this, the parties may use any of the computer systems, including the communications networks, described herein.

Figure 2:
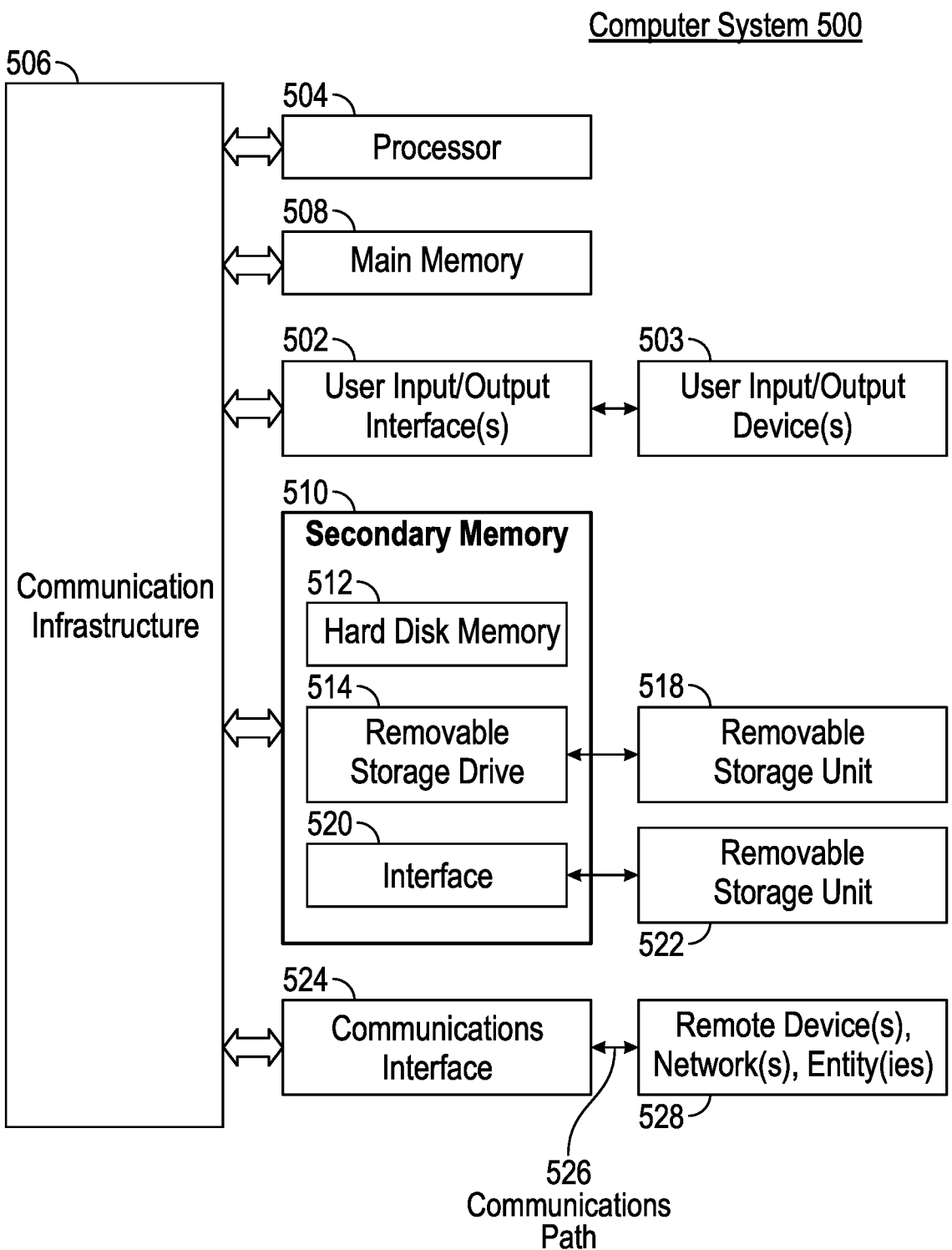
FIG. 2 illustrates an example computer system architecture for implementing the claimed systems and methods.
Figure 3:
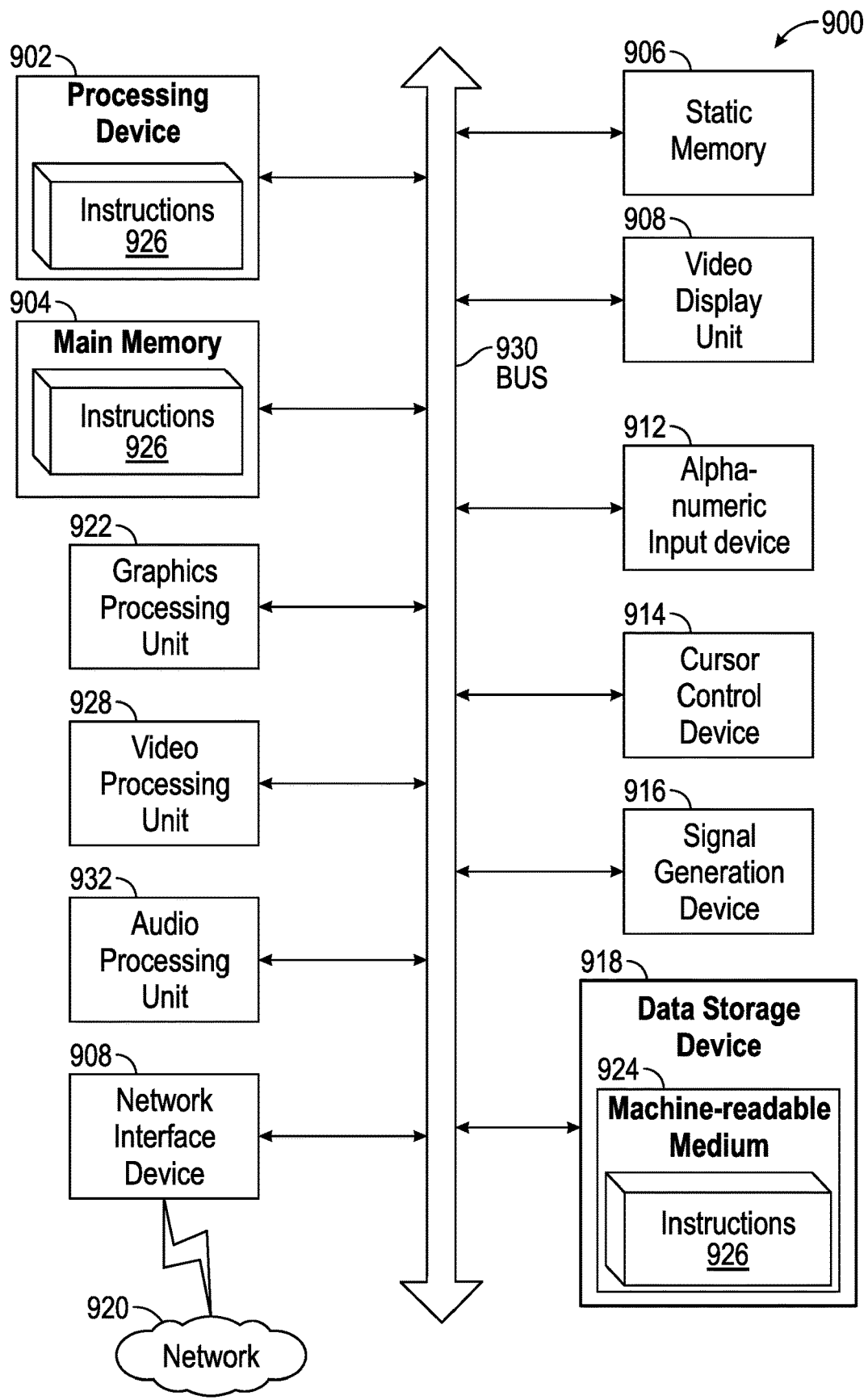
FIG. 3 illustrates further details of an example computer system architecture for implementing the claimed systems and methods.

FIGS. 2 and 3 depict example computer systems useful for implementing various embodiments described in the present disclosure. Various embodiments may be implemented, for example, using one or more computer systems, such as computer system 500 shown in FIG. 2. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity(ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 3 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 2 and 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A method for adaptively secure multiparty non-interactive key exchange, the method comprising:
    establishing, by a computerized hardware processor, a group of parties to derive a shared secret key;
    executing, by the computerized hardware processor, a setup routine at a trusted third party, the setup routine comprising:
    creating, in a computer memory, a hash key hk for a hash function H;
    sampling, using a random number generator, a random key k;
    accessing, from a non-transitory computer-readable storage medium, a specification of a signature scheme;
    generating, by the computerized hardware processor, a set of executable instructions based on: a set of verification keys, an index to one of the verification keys, a message, and a signature, wherein the executable instructions are configured for:
        (1) verifying that the signature is valid for the message for the indexed verification key according to the specification of the signature scheme;
        (2) hashing each of the verification keys in the set using H and hk to generate a corresponding set of output hashes s;
        (3) combining the set of output hashes s together;
        (4) evaluating a pseudorandom function on the combined set of output hashes s using the key k;
    obfuscating, by the computerized hardware processor, the generated set of executable instructions;
    executing, by the computerized hardware processor, a publication routine at each member of the group, the publication routine comprising:
    sampling, using the random number generator, a uniformly random message m;
    sampling, using the computerized hardware processor, a verification key vk for the signature scheme and a signature σ on the message m;
    setting, in the computer memory, a public key to be the verification key vk;
    broadcasting, via a communication interface, the public key to each other member of the group;
    setting, in the computer memory, a member secret key to be a combination of the message m and the signature σ;
    executing, by the computerized hardware processor, a key generation routine at a first member of the group, the key generation routine comprising:
    receiving, via the communication interface, as inputs: the obfuscated set of executable instructions, a set of public keys from other members of the group, an index into the set of public keys, and a first member secret key;
    parsing, by the computerized hardware processor, the first member secret key as a first message and a first signature;
    executing, by the computerized hardware processor, the obfuscated set of executable instructions on the set of public keys, the index into the set of public keys, the first message, and the first signature to generate the shared secret key,
    wherein each public key in the set of public keys is a verification key; and
    distributing, via the communication interface, the set of public keys to the group of parties.

2. The method of claim 1, further comprising generating the pseudorandom function by:
    receiving a specification for a first pseudorandom function F and a group G with a generator g;
    receiving the random key k as an input key;
    receiving the set of output hashes s as an input string s;
    parsing the input string s as a list of component hashes $h_1, \ldots, h_l$;

for each i=1, . . . , l, evaluating F on the input key k and $h_i$ to obtain $t_i$;

generating a string x by operations on $t_1, \ldots, t_l$ with each other;

calculating an exponentiation $g^x$; and outputting a result of the exponentiation as the pseudorandom function.

3. The method of claim 1, wherein the pseudorandom function is further defined by:

a randomized puncturing algorithm that outputs a punctured key;

a first evaluation algorithm configured to check for first predetermined properties in the set of output hashes;

a randomized constraining algorithm configured to output a constrained key; and a second evaluation algorithm configured to check for second predetermined properties in the set of output hashes.

4. A system for adaptively secure multiparty non-interactive key exchange, the system comprising:

a computerized hardware processor;

a computer memory operatively coupled to the computerized hardware processor;

a communication interface operatively coupled to the computerized hardware processor;

a random number generator operatively coupled to the computerized hardware processor;

a non-transitory computer-readable storage medium storing instructions that, when executed by the computerized hardware processor, cause the computerized hardware processor to perform operations comprising:

establishing a group of parties to derive a shared secret key;

executing a setup routine at a trusted third party, the setup routine comprising:

creating, in the computer memory, a hash key hk for a hash function H;

sampling, using the random number generator, a random key k;

accessing, from the non-transitory computer-readable storage medium, a specification of a signature scheme;

generating, by the computerized hardware processor, a set of executable instructions based on: a set of verification keys, an index to one of the verification keys, a message, and a signature, wherein the executable instructions are configured for:

(1) verifying that the signature is valid for the message for the indexed verification key according to the specification of the signature scheme;

(2) hashing each of the verification keys in the set using H and hk to generate a corresponding set of output hashes s;

(3) combining the set of output hashes s together;

(4) evaluating a pseudorandom function on the combined set of output hashes s using the key k;

obfuscating, by the computerized hardware processor, the generated set of executable instructions;

executing a publication routine at each member of the group, the publication routine comprising:

sampling, using the random number generator, a uniformly random message m;

sampling, using the computerized hardware processor, a verification key vk for the signature scheme and a signature σ on the message m;

setting, in the computer memory, a public key to be the verification key vk;

broadcasting, via the communication interface, the public key to each other member . . . of the group;

setting, in the computer memory, a member secret key to be a combination of the message m and the signature σ;

executing a key generation routine at a first member of the group, the key generation routine comprising:

receiving, via the communication interface, as inputs: the obfuscated set of executable instructions, a set of public keys from other members of the group, an index into the set of public keys, and a first member secret key;

parsing, by the computerized hardware processor, the first member secret key as a first message and a first signature;

executing, by the computerized hardware processor, the obfuscated set of executable instructions on the set of public keys, the index into the set of public keys, the first message, and the first signature to generate the shared secret key, wherein each public key in the set of public keys is a verification key; and distributing, via the communication interface, the set of public keys to the group of parties.

5. The system of claim 4, further comprising generating the pseudorandom function by:

receiving a specification for a first pseudorandom function F and a group G with a generator g;

receiving the random key k as an input key;

receiving the set of output hashes s as an input string s;

parsing the input string s as a list of component hashes $h_1, \ldots, h_l$;

for each i=1, . . . , l, evaluating F on the input key k and $h_i$ to obtain $t_i$;

generating a string x by operations on $t_1, \ldots, t_l$ with each other;

calculating an exponentiation $g^x$; and outputting a result of the exponentiation as the pseudorandom function.

6. The system of claim 4, wherein the pseudorandom function is further defined by:

a randomized puncturing algorithm that outputs a punctured key;

a first evaluation algorithm configured to check for first predetermined properties in the set of output hashes;

a randomized constraining algorithm configured to output a constrained key; and a second evaluation algorithm configured to check for second predetermined properties in the set of output hashes.

7. A non-transitory computer-readable media comprising instructions that upon execution cause a computerized hardware processor to perform a method for adaptively secure multiparty non-interactive key exchange, the method comprising:

establishing, by the computerized hardware processor, a group of parties to derive a shared secret key;

executing, by the computerized hardware processor, a setup routine at a trusted third party, the setup routine comprising:

creating, in a computer memory, a hash key hk for a hash function H;

sampling, using a random number generator, a random key k;

accessing, from a non-transitory computer-readable storage medium, a specification of a signature scheme;

generating, by the computerized hardware processor, a set of executable instructions based on: a set of verification keys, an index to one of the verification keys, a message, and a signature, wherein the executable instructions are configured for:
(1) verifying that the signature is valid for the message for the indexed verification key according to the specification of the signature scheme;
(2) hashing each of the verification keys in the set using H and hk to generate a corresponding set of output hashes s;
(3) combining the set of output hashes s together;
(4) evaluating a pseudorandom function on the combined set of output hashes s using the key k;

obfuscating, by the computerized hardware processor, the generated set of executable instructions;

executing, by the computerized hardware processor, a publication routine at each member of the group, the publication routine comprising:
sampling, using the random number generator, a uniformly random message m;
sampling, using the computerized hardware processor, a verification key vk for the signature scheme and a signature σ on the message m;
setting, in the computer memory, a public key to be the verification key vk;
broadcasting, via a communication interface, the public key to each other member of the group;
setting, in the computer memory, a member secret key to be a combination of the message m and the signature σ;

executing, by the computerized hardware processor, a key generation routine at a first member of the group, the key generation routine comprising:
receiving, via the communication interface, as inputs: the obfuscated set of executable instructions, a set of public keys from other members of the group, an index into the set of public keys, and a first member secret key;
parsing, by the computerized hardware processor, the first member secret key as a first message and a first signature;
executing, by the computerized hardware processor, the obfuscated set of executable instructions on the set of public keys, the index into the set of public keys, the first message, and the first signature to generate the shared secret key,
wherein each public key in the set of public keys is a verification key; and distributing, via the communication interface, the set of public keys to the group of parties.

8. The computer-readable media of claim 7, further comprising generating the pseudorandom function by:
receiving a specification for a first pseudorandom function F and a group G with a generator g;
receiving the random key k as an input key;
receiving the set of output hashes s as an input string s;
parsing the input string s as a list of component hashes $h_1, \ldots, h_l$;
for each $i=1, \ldots, l$, evaluating F on the input key k and $h_i$ to obtain $t_i$;
generating a string x by operations on $t_1, \ldots, t_l$ with each other;
calculating an exponentiation $g^x$; and
outputting a result of the exponentiation as the pseudorandom function.

9. The computer-readable media of claim 7, wherein the pseudorandom function is further defined by:
a randomized puncturing algorithm that outputs a punctured key;
a first evaluation algorithm configured to check for first predetermined properties in the set of output hashes;
a randomized constraining algorithm configured to output a constrained key; and
a second evaluation algorithm configured to check for second predetermined properties in the set of output hashes.

10. The method of claim 1, wherein combining the set of output hashes s together comprises:
(a) concatenating the output hashes in a predetermined order; and
(b) applying a compression function to the concatenated output hashes to produce a single combined hash value.

11. The method of claim 1, further comprising:
(a) generating, by the computerized hardware processor, a multi-point binding hash function; and
(b) using the multi-point binding hash function to hash the verification keys in the set of verification keys.

12. The method of claim 1, wherein the obfuscating of the generated set of executable instructions is performed using indistinguishability obfuscation (iO).

13. The method of claim 1, further comprising:
(a) generating, by the computerized hardware processor, a single-point binding signature scheme; and
(b) using the single-point binding signature scheme to generate the signature on the message.

14. The system of claim 4, wherein the operations for combining the set of output hashes s together comprise:
(a) concatenating the output hashes in a predetermined order; and
(b) applying a compression function to the concatenated output hashes to produce a single combined hash value.

15. The system of claim 4, wherein the operations further comprise:
(a) generating, by the computerized hardware processor, a multi-point binding hash function; and
(b) using the multi-point binding hash function to hash the verification keys in the set of verification keys.

16. The system of claim 4, wherein the obfuscating of the generated set of executable instructions is performed using indistinguishability obfuscation (iO).

17. The system of claim 4, wherein the operations further comprise:
(a) generating, by the computerized hardware processor, a single-point binding signature scheme; and
(b) using the single-point binding signature scheme to generate the signature on the message.

18. The computer-readable media of claim 7, wherein the operations for combining the set of output hashes s together comprise:
(a) concatenating the output hashes in a predetermined order; and
(b) applying a compression function to the concatenated output hashes to produce a single combined hash value.

19. The computer-readable media of claim 7, wherein the operations further comprise:
(a) generating, by the computerized hardware processor, a multi-point binding hash function; and
(b) using the multi-point binding hash function to hash the verification keys in the set of verification keys.

20. The computer-readable media of claim 7, wherein the obfuscating of the generated set of executable instructions is performed using indistinguishability obfuscation (iO).

\* \* \* \* \*